2 Sheets—Sheet 2.
P. BINKLEY & J. R. WEBER.
HOISTING AND PUMPING MACHINE.
No. 173,580. Patented Feb. 15, 1876.
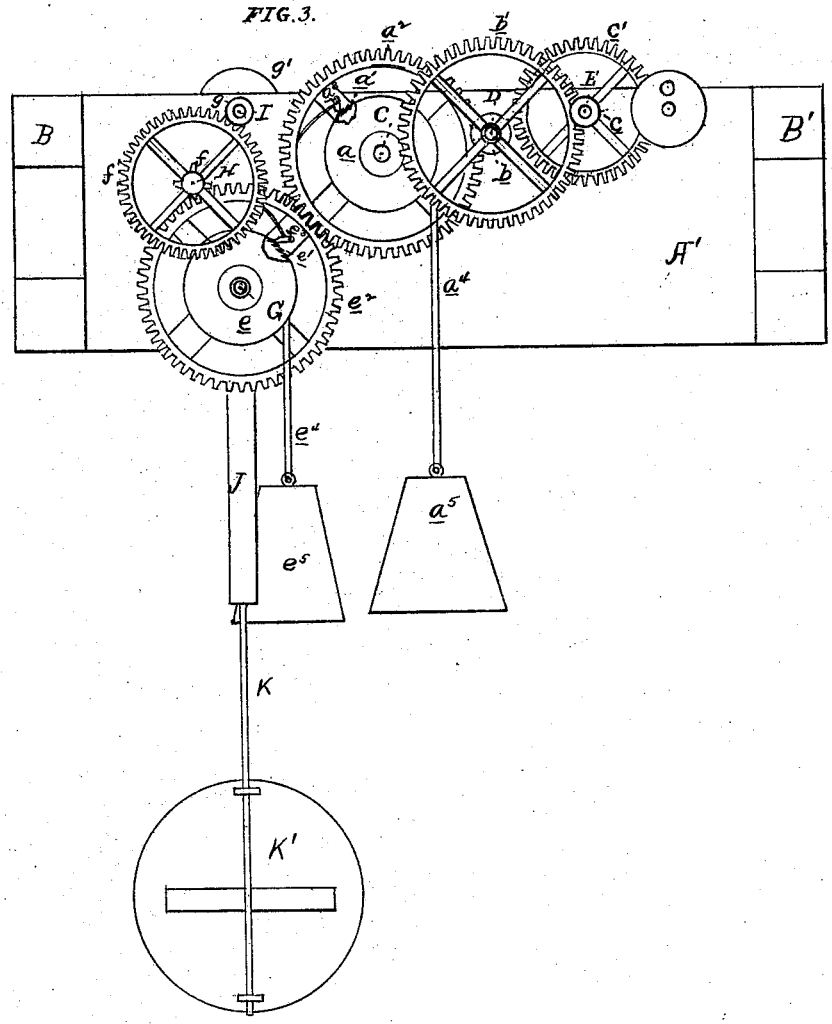
Witnesses
Charles Thurman
R. N. Dyer
Inventors.
Philip Binkley
John R. Weber
by Geo. W. Dyer
Atty.

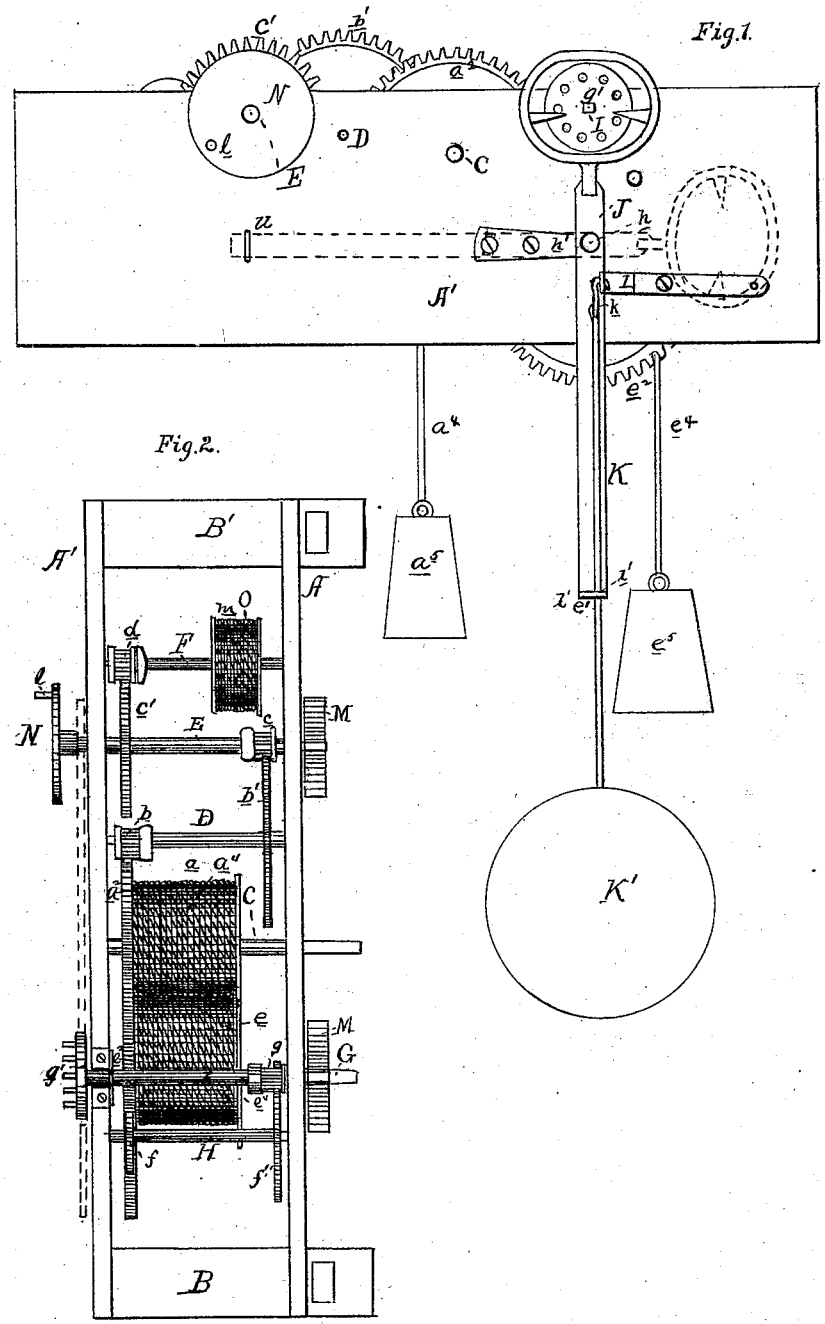
P. BINKLEY & J. R. WEBER.
HOISTING AND PUMPING MACHINE.
No. 173,580. Patented Feb. 15, 1876.

UNITED STATES PATENT OFFICE.

PHILIP BINKLEY AND JOHN R. WEBER, OF ETNA GREEN, INDIANA.

IMPROVEMENT IN HOISTING AND PUMPING MACHINES.

Specification forming part of Letters Patent No. 173,580, dated February 15, 1876; application filed December 3, 1875.

*To all whom it may concern:*

Be it known that we, PHILIP BINKLEY, of Etna Green, in the county of Kosciusko and State of Indiana, and JOHN R. WEBER, of Etna Green, in the county of Kosciusko and State of Indiana, have invented new and useful Improvements in Hoisting and Pumping Machines; and we do hereby declare that the following is a full and exact description of the same, reference being had to the accompanying drawings, and to the letters of reference marked thereon.

The object of our invention is a machine, intended more particularly for farm purposes, for pumping water, operating a churn, or for elevating water, hay, grain, or other material, which will combine a motive power and mechanism for producing a reciprocating motion, as required in operating a churn or pump, and mechanism for producing a simple revolving motion, as required in elevating, and also devices for changing the speed and regulating the motion.

Our invention therein consists in the combination, construction, and arrangement of the operative parts, all as more fully hereinafter explained.

To enable others skilled in the art to make and use our machine, we proceed to describe the same in connection with the drawings, in which—

Figure 1 is a side elevation, showing the regulator and pendulum in position for slow motion, and showing in dotted lines the position of the regulator when a rapid motion is required; Fig. 2, a top view with the parts arranged for slow motion, and showing in dotted lines the position of the fan and regulator when a rapid motion is required; and Fig. 3 is a side elevation from the fan side of the machine, with the side of the frame removed to show the gearing.

Like letters denote corresponding parts in each figure.

A A' represent the sides, and B B' the ends, composing a frame-work for our machine. This frame may be mounted upon wheels, if desired, and thereby form a portable machine. C represents the main force-shaft, journaled in the sides A A', and projecting through the side A, where its end is squared and adapted to receive a lever for turning the same, and may be provided with any suitable gearing for turning such shaft when the weight to be raised is very heavy. On the shaft C is keyed a flanged and grooved drum, $a$, one flange forming ratchet-teeth $a^1$. On the shaft C is sleeved a large cog-wheel, $a^2$, having a spring-pawl, $a^3$, engaging with the teeth $a^1$ on the drum $a$. To the drum $a$ is attached the end of a rope, $a^4$, supporting a weight, $a^5$. D is a shaft, journaled in the sides A A', toward the end B' of the machine, and is provided with a pinion, $b$, meshing with the cog-wheel $a^2$. The shaft D is also provided with a large cog-wheel, $b'$, which meshes with a pinion, $c$, on a shaft, E. The shaft E is provided with a large cog-wheel, $c'$, which meshes with a pinion, $d$, on a shaft, F. G is a force-shaft, similar to the shaft C, and having a flanged and grooved drum, $e$, ratchet-teeth $e^1$, large cog-wheel $e^2$, spring-pawl $e^3$, rope $e^4$, and weight $e^5$, all similar to the parts connected with the shaft C, the cog-wheels $e^2$ and $a^2$ meshing with each other. The cog-wheel $e^2$ also meshes with a pinion, $f$, on a shaft, H. The shaft H is provided with a large cog-wheel, $f'$, which meshes with a pinion, $g$, on the regulator-shaft I, carrying a regulating-wheel, $g'$, on its end, projecting through the side A' of the machine. J is the regulating-arm, engaging with the pins on the wheel $g'$, in the usual manner. The regulating-arm is pivoted to the side A', on a stud, $h$, which projects from a plate, $h'$, secured to the side of the machine, extends downwardly, and has its lower end $i$ bent outwardly, and at right angles to the body of the arm, and provided with a slot, $i'$. K is the pendulum, which is passed through the slot $i'$, and has the pendulum-ball K' adjustably secured thereto by a loose leaf-spring, which is placed on the ball, between the lugs, near its ends, and presses outwardly on the pendulum. The upper end of the pendulum is supported by a pivoted link, $k$, which is pendent from an arm, L, secured to the side A' of the machine, below and on one side of the regulating-wheel $g'$. The regulating-shaft I projects through the side A of the machine, and is adapted to receive on its end a fan-wheel, M, which is removably secured thereto. The shaft E extends through the side A of the machine, and is adapted, like the shaft I, to receive on its end a fan-wheel, which may be the fan-wheel M, or another similar fan, one or two fans being used, as found necessary. The other end of the shaft E also projects through the side A', where a crank-wheel, N, is secured to the shaft, provided with a crank-pin, $l$, and suitable pitmen for producing a reciprocating motion. On the shaft F, at any suitable point either within or without the frame of the machine, is keyed a pulley-drum, O. This drum is, preferably, provided with flanges, and has one end of a rope, $m$, secured thereto, adapted to be wound upon said pulley, for elevating or other analogous purposes.

For a regulated and uniform motion, as required in churning or pumping, the machine is placed in the required position on an elevated platform, or otherwise, and the piston of the pump or churn connected to the crank-wheel N by suitable pitmen. The regulator and pendulum are put in position, the fan or fans M removed, and the shafts C and G wound up. The machine can then be left to take care of itself till the proper time when the operation of pumping or churning is finished.

For elevating, where a greater speed is required, the pendulum and ball are removed, and the regulating-arm raised onto a hook, $u$, on the side A' of the machine. The fan or fans M are placed on their proper shafts, the shafts C and G being wound up, and the rope $m$ attached, through pulleys, with any weight desired to be elevated.

Either of the shafts may have any of the ordinary devices for throwing it out of gear, and a brake may be attached at any convenient point.

The number of the weights is not essential.

Having thus fully described our invention, what we claim as new, and desire to secure by Letters Patent, is—

1. In a machine adapted for hoisting and pumping, the combination, with the weights, and a train of gearing for operating the same, of the shaft E, carrying the crank-wheel N, the shaft F, provided with the drum O, the fan or fans M, and the pendulum, all constructed and arranged substantially as described and shown.

2. In a machine, substantially as described, the combination of the regulating-arm J, pivoted to the side of the machine, and having a slotted lower end, the pendulum K passing through the said slotted end, and hung at its upper end independently of the said arm, the ball K' and hook $u$, all constructed and arranged substantially as described and shown.

This specification signed and witnessed this 15th day of November, 1875.

PHILIP BINKLEY.
JOHN R. WEBER.

Witnesses:
JOHN M. REID,
SAMUEL MELICK.